INVENTOR
HIDEYASU MAJIMA

BY Paul M. Craig, Jr.
ATTORNEY

INVENTOR
HIDEYASU MAJIMA

BY Paul K. Craig, Jr.
ATTORNEY

INVENTOR
HIDEYASU MAJIMA

BY Paul M. Craig, Jr.
ATTORNEY

United States Patent Office 3,444,530
Patented May 13, 1969

3,444,530
OPTO-ELECTRONIC INPUT AND OUTPUT MEMORY DEVICE

Hideyasu Majima, Hachioji-shi, Japan, assignor to Hitachi, Ltd., Tokyo, Japan, a corporation of Japan
Filed Apr. 8, 1966, Ser. No. 541,389
Claims priority, application Japan, Apr. 14, 1965, 40/21,609
Int. Cl. G11b 7/00
U.S. Cl. 340—173 3 Claims This invention relates to a novel type of opto-electronic input output memory device with which a high-speed write-in and read-out operation can easily be effected.

Conventional large-capacity memory means include magnetic discs, magnetic tapes and the likes, but these conventional memory means have been defective in that mechanically high techniques are generally required for the satisfactory operation thereof, troublesome procedures are required in their handling and they have invariably a short service life. Various other difficulties have been encountered with these memory means because they are not of random access type and they can only operate at a slow speed.

In the prior art electronic computer operation, separate machines and media are employed to attain the desired operation, for example, cards and paper tape punchers for input means, line printers and perforating typewriters for output means, and magnetic discs and magnetic tapes for memory means. Thus various kinds of machines and media are uneconomically employed in the prior art electronic computer operation.

With a view to eliminate the prior defects and difficulties as described above, it is the primary object of the present invention to provide an opto-electronic input output memory device in which a single medium can take care of input, output and memory in all electronic fashion, which has a large capacity comparable to that of magnetic discs and which can make a non-destructive read-out operation at such a high speed comparable to that of magnetic cores.

Another object of the present invention is to provide an opto-electronic input output memory device of random access type so that various forms of data can not only be stored in the form of digital dot informations but also be stored in the form of random memories such as characters and figure patterns.

According to the present invention, there is provided an opto-electronic input output memory device comprising a plurality of memory planes each consisting of stacked layers of a first conductor, a photoconductor, a ferroelectric substance having both of the property of rotatory polarization and the hysteresis characteristic with respect to voltage and a second conductor, means for forming optical images in said memory planes, means for applying voltage to said memory planes, means for emitting light for reading out memories stored in said memory planes, said light emitting means being operative to cause a variation in the stable hysteresis states of said ferroelectric substance by varying the conductivity of said photoconductor for thereby developing stored pattern portions and non-stored portions in said memory planes, and means for detecting the light passed through or reflected from said memory planes for thereby effecting read-out of memories.

Other objects, advantages and features of the present invention will become apparent from the following description with reference to the accompanying drawings, in which:

FIG. 1 is a diagrammatic perspective view showing the general arrangement of the device embodying the present invention;

FIGS. 2*a* and 2*b* are diagrammatic views showing two practical forms of a memory plane used in the device of FIG. 1;

FIG. 3 is a diagrammatic sectional view illustrating a manner of read-out operation with the memory plane as shown in FIG. 2;

FIGS. 4*a* and 4*b* are graphic illustrations of hysteresis characteristics of a gyro-electric crystal and a hyper gyro-electric crystal with respect to voltage;

Figures 1, 2A:
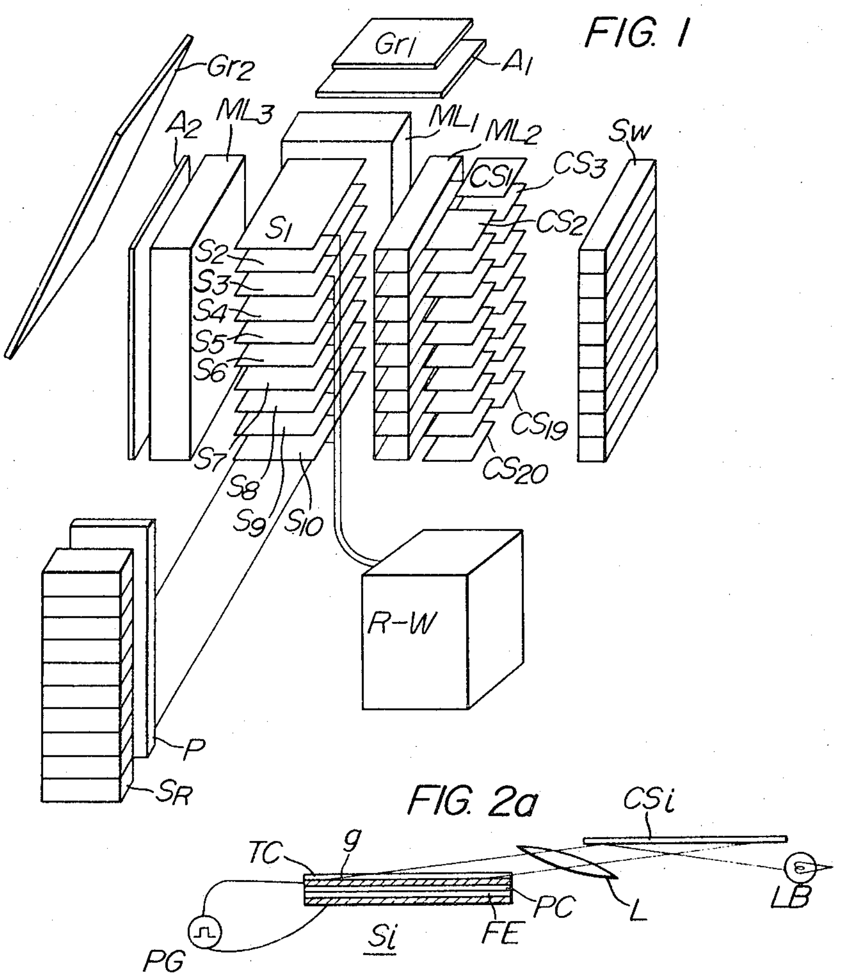

Referring now to FIG. 1, there is shown the general arrangement of the opto-electronic input output memory device embodying the invention, which includes a memory stack which is here shown as composed of ten memory planes $S_1, \ldots, S_{10}$. A light source $S_R$ is suitably placed in order to direct beams of read-out light towards these ten memory planes $S_1, \ldots, S_{10}$ at predetermined angles with respect therein and is adapted to selectively emit light as desired. A polarizer P is disposed so as to polarize the beams of light which are projected from the light source $S_R$ to be focussed on the memory planes $S_1, \ldots, S_{10}$. A focussing means $ML_1$ in the form of a lens and reflecting mirror system is provided so that that portion of the polarized read-out light which has been transmitted through or has been reflected by the memory planes $S_1, \ldots, S_{10}$ can be guided onto a frosted glass plate or a light amplifier $Gr_1$. A polarized light analyser $A_1$ consisting of a polarizer is disposed below the light amplifier $Gr_1$.

Two stacked blocks of cards $CS_1, \ldots, CS_{20}$ carrying records of information to be written in are disposed before a write-in light source $Sw$ so that any desired card can selectively be illuminated by the light source $Sw$. A lens and mirror system $ML_2$ focuses patterns carried on these cards $CS_1, \ldots, CS_{20}$ onto the memory planes $S_1, \ldots, S_{10}$. A lens and mirror system $ML_3$ similar to the lens and mirror system $ML_1$ is provided to read out the patterns transferred to the memory planes $S_1, \ldots, S_{10}$. The light which has passed through or has been reflected by the memory planes $S_1, \ldots, S_{10}$ is transmitted through a polarized light analyser $A_2$. As in the case of the light amplifier or frosted glass $Gr_1$, images read out from the memory planes $S_1, \ldots, S_{10}$ are focussed on an image-forming plate $Gr_2$. Two similar pattern reproducing members $Gr_1$ and $Gr_2$ are provided herein in order that one of them may serve for reading by a man while the other may serve for reading by a machine. The photoelectric memory stack of memory planes $S_1, \ldots, S_{10}$ is adapted to be operated from an operating pulse source R–W.

In FIG. 2, there is shown in cross section two practical structures of the memory planes $S_1, \ldots, S_{10}$ appearing in FIG. 1. In FIG. 2*a*, this memory plane is generally designated by reference character $Si$ and comprises a layer TC of transparent conductor material such as NESA glass or $SiO_2$ film, a photoconductor sheet PC of material such as CdS or CdSe, a layer FE of gyro-electric material such as tri-glysin sulfate, sodium nitrite or tri-hydrate lithium selenite, or of hyper gyro-electric material such as Rochelle salt or strontium dicalcium propionate, and a layer C of electric conductor. A pulse generator PG is connected to the transparent conductor layer TC and the conductor layer C to apply pulse voltage thereacross. Reference character $CSi$ designates an article such as a card, document or graph, and a light beam LB from a light source is reflected by the article $CS_i$ so that a pattern on the article $CS_i$ can be transferred through a lens L for being focussed on the memory plane $S_i$. The NESA film TC is supported on a glass base plate *g*.

Figure 2B:
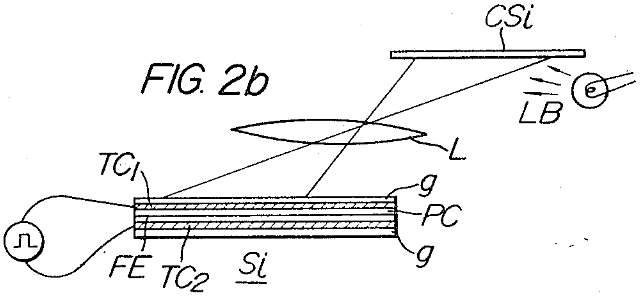

The arrangement shown in FIG. 2*b* is substantially similar to that shown in FIG. 2*a*, except that a conductor C of transparent nature is employed herein and the upper and lower faces of the memory plane $S_i$ are formed of transparent conductors $TC_1$ and $TC_2$.

Figure 4A:
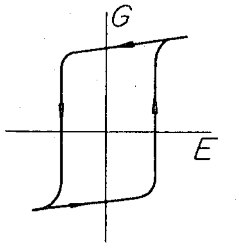
Figure 4B:
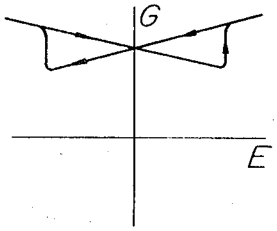

The arrangement shown in FIG. 2*a* represents a case in which the conductor layer C forming the lower face of the memory plane $S_i$ is of light absorptive nature and light reflected from the gyroelectric or hyper gyro-electric material layer FE is utilized for the write-in operation of the pattern. More precisely, a gyroelectric crystal and a hyper gyro-electric crystal forming the layer FE have a hysteresis characteristic in their behaviour of rotatory polarization as shown in FIGS. 4*a* and 4*b*, respectively, in which an angle of rotatory polarization G of these crystals is plotted against voltage E. Thus, stored pattern portions and non-stored portions in such crystals are in their individual states of the two stable states in this type of hysteresis characteristic and therefore they have different reflective indexes and Brewster's angles. Due to the above fact, portions other than the character portions of a pattern will become dark and the character portions will become brighter than the remaining portions by suitably fixing the direction of the analyser in a manner that it does not permit transmission of polarized light of light beams incident thereupon at Brewster's angles other than those of the character portions.

The arrangement shown in FIG. 2*b* is somewhat different from that of FIG. 2*a* in that, while polarized light incident upon the upper or lower face during read-out operation is admitted therethrough, a pattern is read out by the polarized light analyser disposed below the memory plane by virtue of the fact that character portions and the remaining portions of the pattern have different angles of rotatory polarization.

In any of the above cases, the photoconductor layer PC may desirably be of transparent nature for the successful read-out operation. To this end, an activated photoconductor of crystalline nature equipped with sufficient photoconductivity may be employed or the wavelength of light used in read-out operation may be so selected as to be longer than the absorption end of such photoconductor.

A manner of write-in operation will be described with reference to FIG. 2. In write-in operation, a uniform beam of light is projected onto the photoconductor layer PC and at the same time a positive pulse is supplied from the pulse generator PG to reset the gyro-electric material or hyper gyro-electric material FE. Then, a pattern on the card $CS_i$ is focussed on the memory plane $S_i$ and a negative pulse is applied from the pulse generator PG to write the pattern on the card $CS_i$ in the memory plane $S_i$. Since the light beam is not reflected from the character portions on the card $CS_i$, the corresponding portions on the memory plane $S_i$ are solely dark while the remaining portions become bright and the photoconductor PC becomes conductive at those portions corresponding to the bright portions. Under this situation, a negative pulse at sufficiently high level is supplied from the pulse generator PG to set those portions other than the character portions and to leave the character portions under the reset state. The above operation completes storage of memory in the memory plane $S_i$.

Figure 3:
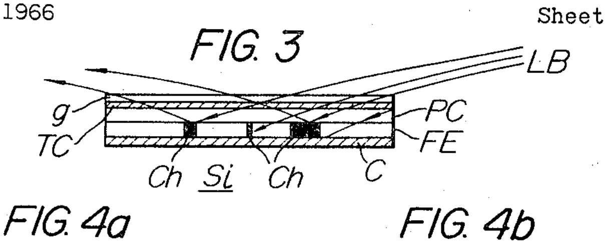

Read-out operation will next be described with reference to FIG. 3 showing a case in which perfect reflection from the photoconductor layer PC and the gyro-electric or hyper gyro-electric layer FE is utilized for read-out. As shown in FIG. 3, parallel rays of light LB incident upon the memory plane $S_i$ from above are perfectly reflected by stored character portions *ch* in the gyro-electric or hyper gyro-electric layer FE but these rays are refracted at non-stored portions to be deflected into the gyro-electric or hyper gyro-electric layer FE. Thus, it is possible to make the reflective index of the stored character portions greater than that of the non-stored portions with respect to monochromatic light incident upon the memory plane $S_i$ from any desired direction. Those portions of the light which are reflected from the gyro-electric or hyper gyro-electric layer FE can be derived outside in the form of a pattern stored in the memory plane $S_i$, but the refracted portions of the light are absorbed by the light-absorptive conductor layer C.

Referring again to FIG. 2*b*, stored character portions and non-stored portions will have different relative angles of rotation against normal light rays and abnormal light rays when the light beam LB is incident upon the memory plane $S_i$ in slanted relation with respect thereto and is transmitted through the gyro-electric or hyper gyro-electric layer FE. Therefore it is also possible to utilize the interference of light so as to make the character portions dark and the remaining portions bright.

Figure 5:
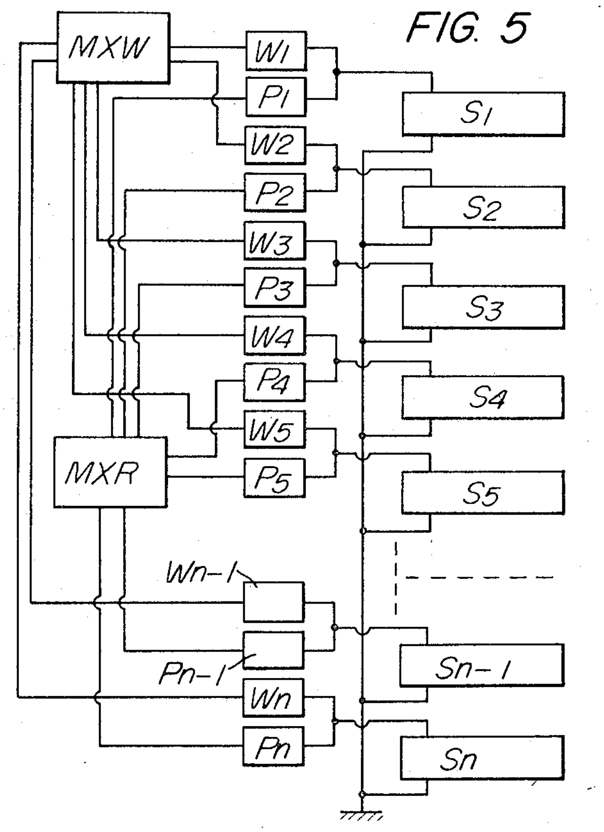
FIG. 5 is a block diagram showing the structure of a selective driving circuit for a memory stack.

FIG. 5 is a block diagram showing a preferred structure of a selective driving circuit for use with the memory stack of FIG. 1. The selective driving circuit includes write-in pulse switches $W_1, \ldots, W_n$ for memory planes $S_1, \ldots, S_n$, reset pulse switches $R_1, \ldots, R_n$ for the memory planes $S_1, \ldots, S_n$, a matrix circuit MXW for the selection of write-in pulses, and a matrix circuit MXR for the selection of reset pulses. These matrix circuits cooperate to effect proper selection of predetermined pulses.

Figure 6:
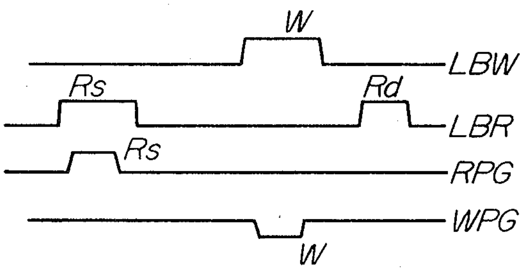
FIG. 6 is a graphic illustration of waveforms of read/write pulses.

FIG. 6 shows an example of a pulse program preferably used for the resetting, write-in and read-out operations. Waveform LBW represents a light beam from a write-in light source and includes a write-in light pulse W. Waveform LBR represents a light beam from a read-out light source and includes a resetting light pulse $R_s$ and a read-out light pulse $R_d$ therein. Waveform RPG represents a pulse program from a resetting voltage pulse generator and includes therein a pulse $R_s$ which is synchronized with the light pulse $R_s$ in the woveform LBR. Waveform WPG represents a write-in pulse program and includes therein a write-in voltage pulse W which is applied to each memory plane and is in synchronization with the light pulse W in the waveform LBW.

Figure 7:
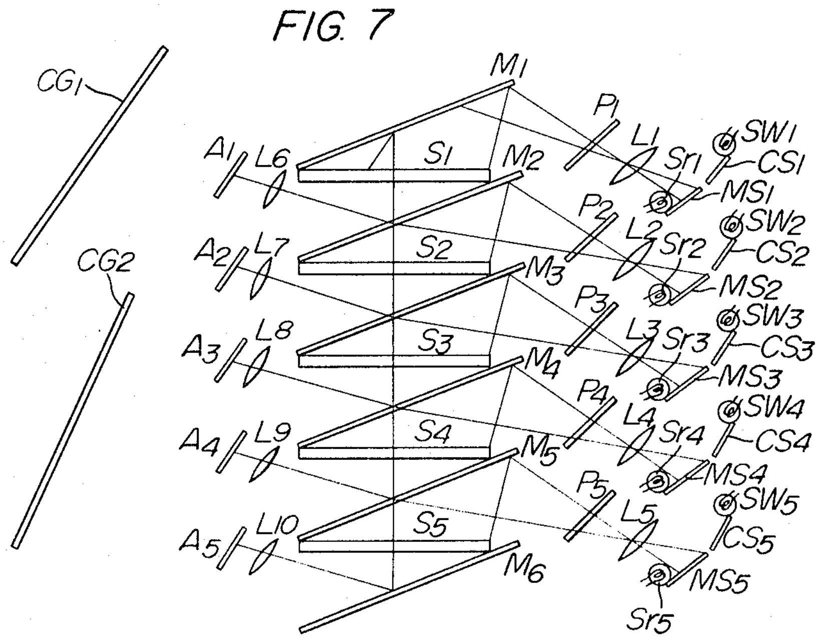
FIG. 7 is a diagrammatic view showing one form of the write/read section in the device of FIG. 1.

A manner of resetting and read-out operation will next be described with reference to FIG. 7. FIG. 7 shows one form of the structure of write-in and read-out section of the memory device. In the arrangement shown in FIG. 7, light from read-out light sources $Sr_1, \ldots, Sr_5$ illuminates the reflecting faces of reflecting mirrors $MS_1, \ldots, MS_5$, respectively. Write-in light sources $SW_1, \ldots, SW_5$ corresponding to the light source SW in FIG. 1 are disposed opposite respective cards $CS_1, \ldots, CS_5$. It will be seen that these light sources $Sr_1, \ldots, Sr_5$ and $SW_1, \ldots, SW_5$ are associated with respective memory planes $S_1, \ldots, S_5$, and corresponding polarizers $P_1, \ldots, P_5$ are provided to polarize read/write light beams from the respective light sources. Reflecting mirrors $M_1, \ldots, M_6$ having reflecting faces on both sides are provided so that patterns on the cards $CS_1, \ldots, CS_5$ can be focussed on the memory planes $S_1, \ldots, S_5$ during write-in operation and read-out light from the mirrors $MS_1, \ldots, MS_5$ can be reflected thereby for being focussed on the memory planes $S_1, \ldots, S_5$ during read-out operation.

Read-out operation can be effected in the following manner. Suppose now $Sr_3$ is selected as a read-out light source. In this case, solely the light source $Sr_3$ of all the light sources $Sr_1, \ldots, Sr_5$ emits the light beam, which is then reflected by the read-out reflecting mirror $MS_3$ and is turned into polarized light during its passage through the polarizer $P_3$. This polarized light is then incident upon the upper face of the memory plane $S_3$. Since the polarized light led into the memory plane $S_3$ has different angles of rotation at character portions and portions other than the character portions, the character portions when viewed through an analyser may be made transparent with respect to the projected light beam if the portions other than the character portions may be opaque to the light beam. In such a case, the pattern stored in the memory plane $S_3$ can be derived as an image from the lower face of the memory plane $S_3$. This image is then focussed on an image-forming plane $CG_2$ through the reflecting mirror $M_4$ and a lens $L_8$. Here, image-forming planes $CG_1$ and $CG_2$ are pattern reproducing means in the form of flat plate such as a frosted glass plate or light amplifier, and the pattern reproducing plate $CG_1$ is used to reproduce images from the memory planes $S_1$ and $S_2$ through respective lenses $L_6$ and $L_7$, while the pattern reproducing plate $CG_2$ is used to reproduce images from the memory planes $S_3$, $S_4$ and $S_5$ through respective lenses $L_8$, $L_9$ and $L_{10}$. Analysers $A_1, \ldots, A_5$ are shown herein as disposed on the rear sides of the lenses, but may be disposed directly beneath the respective memory planes $S_1, \ldots, S_5$.

The above description has referred to the case in which five memories are focussed on two pattern reproducing plates. However, it will be understood that a further greater number of images may be focussed on a single image reproducing plate by suitably adjusting the directions of the images, lenses, reflecting mirrors and the like. It will also be understood in this connection that, where the beams of light passed through the image-forming lenses $L_1, \ldots, L_5$ are very close to parallel rays or where parallel rays are incident upon the reflecting mirrors $M_1, \ldots, M$ at their Brewster's angles, the light reflected from the reflecting mirrors $M_1, \ldots, M_5$ becomes polarized and the polarizers $P_1, \ldots, P_5$ will thereby be dispensed with. It will further be understood that, by projecting parallel rays of monochromatic light directly onto the memory planes $S_1, \ldots, S_5$, transmitted light rays will interfere with each other to form high-light portions and low-light portions due to the fact that stored pattern portions and non-stored portions have different relative angles of rotation against normal light rays and abnormal light rays. It is thus possible to make the stored pattern portions dark or bright with respect to the non-stored portions.

Figure 8:
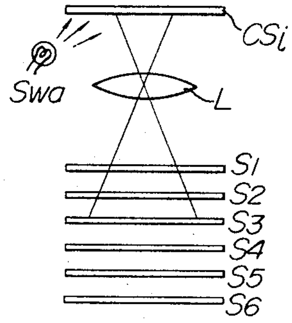
FIG. 8 is a diagrammatic view showing one form of write-in operation.

FIG. 8 shows an arrangement for simplifying the write-in operation. In FIG. 8, a pattern on a sheet of paper CS*i* is focussed through a lens L memory planes $S_1, \ldots, S_6$ to write a character therein, and any one of them may arbitrarily be selected as in the case of FIG. 1. In this case, the write-in light beam must pass through all of the photoconductors, and in this respect, it will be effective to arrange photoconductors having different absorption ends from one another.

In foregoing description, a transparent conductor has been employed for use as an electrode which is brought into contact with the photoconductor layer, but it will be understood that a meshwork of conductor may equally effectively be utilized as long as it consists of fine wires which will not obstruct proper recording of a pattern.

What is claimed is:

1. An opto-electronic input memory device comprising a plurality of memory planes each consisting of stacked layers of a first conductor, a photoconductor, a ferroelectric substance having both of the property of rotatory polarization and the hysteresis characteristic with respect to voltage and a second conductor, means for forming optical images in said memory planes, means for applying voltage to said memory planes, means for emitting light for reading out memories stored in said memory planes, said light emitting means being operative to cause a variation in the stable hysteresis states of said ferroelectric substance by varying the conductivity of said photoconductor for thereby developing stored pattern portions and non-stored portions in said memory planes, and means for detecting the light passed through or reflected from said memory planes for thereby effecting read-out of memories.

2. An opto-electronic input output memory device according to claim 1, in which said light for the read-out of memories is incident upon said memory plane in slanted relation with respect thereto so that the light rays passing through said memory plane interfere with each other and stored pattern portions and non-stored portions can be read out as a bright-dark contrast on an analyser.

3. An opto-electronic input output memory device according to claim 1, in which a reflecting mirror is associated with each of said memory planes in slantingly superposed relation with respect thereto and an image to be written in said memory plane or a read-out light beam is admitted into said memory plane through said reflecting mirror.

References Cited

UNITED STATES PATENTS 3,229,261 1/1966 Fatuzzo ------------ 340—173

TERRELL W. FEARS, *Primary Examiner.*

U.S. Cl. X.R.

88—1; 96—1; 250—213